July 2, 1968 F. E. GENTRY 3,391,310

SEMICONDUCTOR SWITCH

Filed Jan. 13, 1964 4 Sheets-Sheet 1

INVENTOR:
FINIS E. GENTRY,
BY [signature]
HIS ATTORNEY.

SEMICONDUCTOR SWITCH

Filed Jan. 13, 1964 4 Sheets-Sheet 2

INVENTOR:
FINIS E. GENTRY,
BY [signature]
HIS ATTORNEY.

SEMICONDUCTOR SWITCH

Filed Jan. 13, 1964 4 Sheets-Sheet 3

INVENTOR:
FINIS E. GENTRY,
BY Urban H. Faubion
HIS ATTORNEY.

SEMICONDUCTOR SWITCH

Filed Jan. 13, 1964

INVENTOR:
FINIS E. GENTRY,

BY Urban H. Faubion
HIS ATTORNEY.

3,391,310
Patented July 2, 1968

3,391,310

SEMICONDUCTOR SWITCH

Finis E. Gentry, Skaneateles, N.Y., assignor to General Electric Company, a corporation of New York Filed Jan. 13, 1964, Ser. No. 337,384
12 Claims. (Cl. 317—235)

ABSTRACT OF THE DISCLOSURE

A solid state bi-directional switch having five regions and four intermediate rectifying junctions with main current carrying terminals or contacts which contact both an external emitter region and the next internal region provided on both sides of the device so that each of the junctions between external emitter is a shorted junction and a gate connection coupled with an outer one of the three internal regions in order to provide firing for both halves of an applied alternating voltage.

This invention relates to bilateral semiconductor switches of the type which can be switched between two states of impedance, i.e., between a high impedence and a low impedance for current conduction in both directions through the semiconductor device.

Semiconductor switches have become an important component in a wide variety of control applications, particularly PNPN three terminal devices of the type frequently referred to as silicon controlled rectifiers. Operation of such devices is described in Chapter 1 of the General Electric Controlled Rectifier Manual, second edition, copyright 1961 by the General Electric Company, the article by Moll, Tanenbaum, Goldey and Hononyak in Proceedings of the IRE, September 1956, volume 44, pages 1174 to 1182, and in the copending patent application, Ser. No. 838,504, entitled, Semiconductor Devices and Methods of Making Same, filed Sept. 8, 1959, in the name of Nick Holonyak, Jr., and Richard W. Aldrich and assigned to the assignee of the present application.

The SCR is made an active element in the circuit by connecting two of its three terminals (its anode and cathode terminals) in the circuit to be controlled. With the switch in its "off" condition the rectifier acts as a high impedance element. Except for a very small leakage current, the switch acts as an open circuit. When the switch is in its "on" condition, it presents a very low impedance device (essentially a short circuit) to current flowing in one direction but still acts as a high impedance element to current in the opposite direction. The usual mechanism for rendering the SCR conductive is to introduce current into a third lead or terminal (called the triggering or gate lead) which increases the current flowing through the device and thereby renders the device conductive. This action is descriptively referred to as triggering the device or turning it on.

From the above description, it is seen that the SCR is essentially a unidirectional control element. That is, a single SCR is a device which blocks one-half cycle of an alternating current source and exercises control during the other half cycle. In order to exercise full-wave power control, two or more SCR's must be used or the alternating source must be rectified to provide a pulsating unidirectional wave. This, for many applications, makes it difficult to justify the use of SCR control on an economic basis. This is particularly true for very simple functions such as on-off switching and manual adjustment of power level.

An object of the present invention is to provide a semiconductor switching device which gives full wave power control of an alternating current. Since the device conducts in both directions, it can be made self-protecting against voltage transients and does not then require special protective circuitry. Further, the single device performs functions usually requiring two or more SCR's. Consequently, economics are in favor of the three-lead bilateral switch of the present invention in full wave control of alternating currents. Certainly, the single device takes less space and requires fewer connections than the units which it displaces.

The bilateral two-lead (diode) semiconductor switch as described in the copending Holonyak patent application, supra, represents one attempt to accomplish the objects of this invention. While the diode semiconductor switch is a significant advance, it suffers from a number of disadvantages which the present invention avoids. For example, the three-lead bilateral switch requires less trigger power and, in general, fewer and less sophisticated circuit components for triggering. In addition, operating parameters such as breakover voltages and the minimum current required to keep the device in conduction once fired (holding current) are less critical in typical applications for the three-lead device.

The copending Holonyak patent application, supra, also describes a bilateral three terminal semiconductor switch which provides control of both half cycles of an alternating source from a single gate terminal. This device also represents an extremely significant advance but has the disadvantage that the gate terminal must be referenced to one main terminal to control conduction in one direction and the other main terminal to control conduction through the device in the opposite sense. It is preferable to be able to control conduction in both directions by referencing the gate terminal to only one of the main device terminals. In fact, a device which does meet this criterion may not be practical for many circuit applications.

Three lead bilateral switches which meet the requirements thus far enumerated are described and claimed in the copending patent application, Ser. No. 331,776 filed Dec. 19, 1963 in the name of F. W. Gutzwiller entitled Semiconductor Switch, and assigned to the assignee of the present invention. These switches utilize two gate contacts on the semiconductor pellet (though only one device gate terminal) in order to provide proper switching action and sensitivity.

In carrying out the present invention, a single three-lead (three terminal) semiconductor device is provided which controls both parts of the output of an atlernating power source and thus eliminates the need for two or more unilateral switching devices. This is accomplished by providing in one semiconductor pellet an integrated circuit which incorporates the functions of a pair of controlled rectifiers connected to provide control of an alternating power source and provides proper switching action and sensitivity with only one gate contact to the semiconductor pellet and one gate terminal to control firing for either direction of conduction. In addition, the gate terminal need be referenced to only one of the other two terminals. In accordance with one aspect of the invention, the structure for the integrated circuitry includes a single semiconductor pellet which incorporates three contiguous regions of opposite conductivity type defining two intermediate rectifying junctions. On each of the external regions of the three regions but not coextensive therewith, at least one other region (called an external emitter region) is provided which is of opposite conductivity type and thus forms another rectifying junction with the adjacent regions. These external regions are so formed that a portion of regions on opposite sides overlap. Thus, the pellet has five regions and four intermediate rectifying junctions. Main current carrying terminals or contacts are provided which contact both the external emitter regions and the next internal region (external region of the three regions) so that each of the junctions between the external emitters is a shorted junction and the device thus far described is similar to a five-layer two-lead bilateral switch. In each embodiment, a gate connection is electrically coupled with an external region of the three regions. In order to provide different operating characteristics for different embodiments, the nature of the electrical coupling varies.

The features which are believed to be characteristic of the invention are set forth with particularity in the appended claims. The invention itself however, both as to its organization and advantages thereof may best be understood by reference to the following description taken in connection with the accompanying drawings in which:

FIGURES 1, 2, 3 and 4 are diagrammatic sectional views of a three-lead bilateral semiconductor switch device constructed in accordance with principles of this invention showing symbols used in explaining the device switching mechanism and progressive stages of conditions for device turn on;

Figures 6, 7, 8:
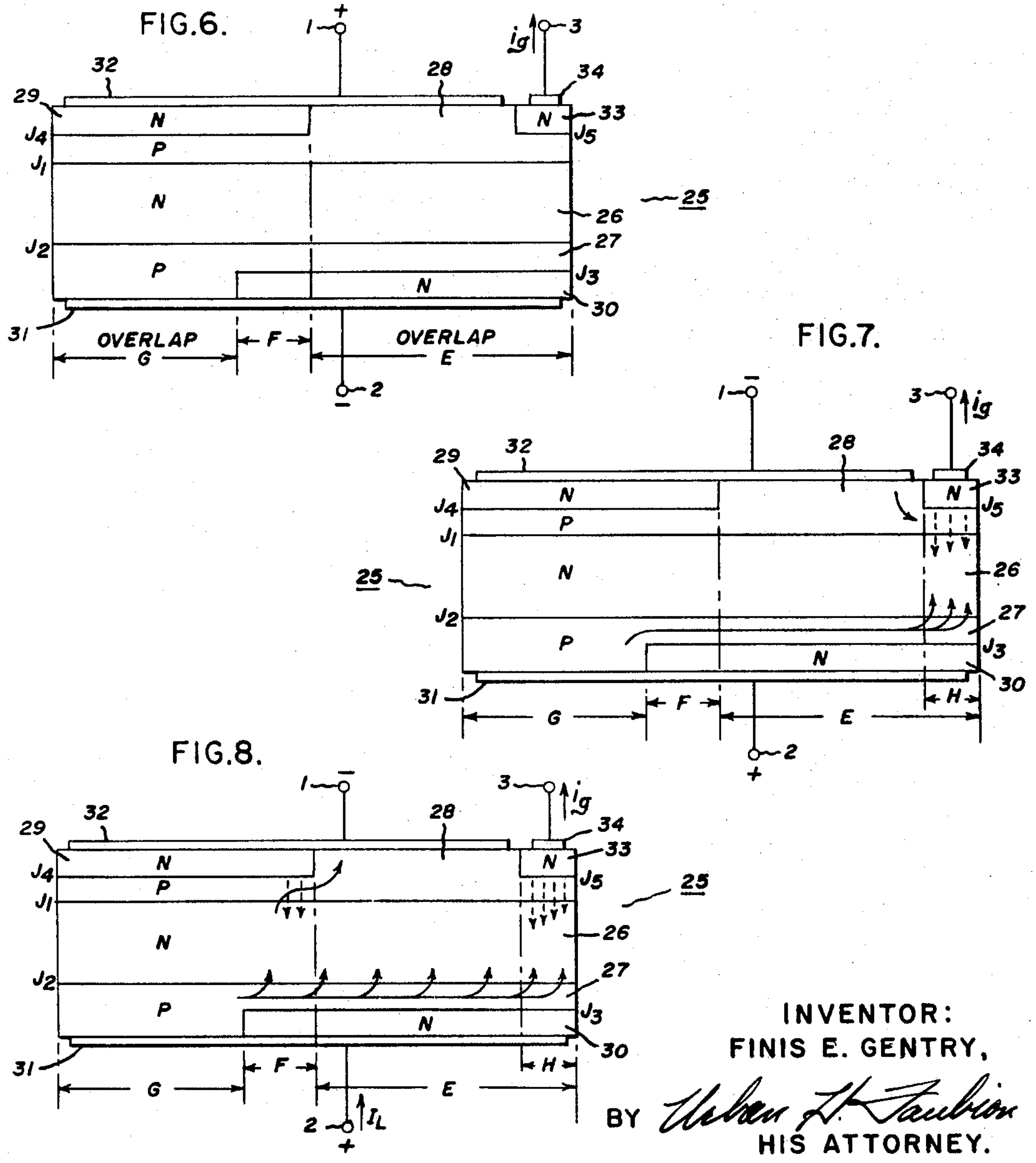
FIGURE 6 illustrates somewhat schematically one particular embodiment of three terminal controllable bilateral semiconductor switch which exhibits the properties of the present invention and which is constructed utilizing the principles of the present invention.
Figures 9, 10, 11, 12, 13:
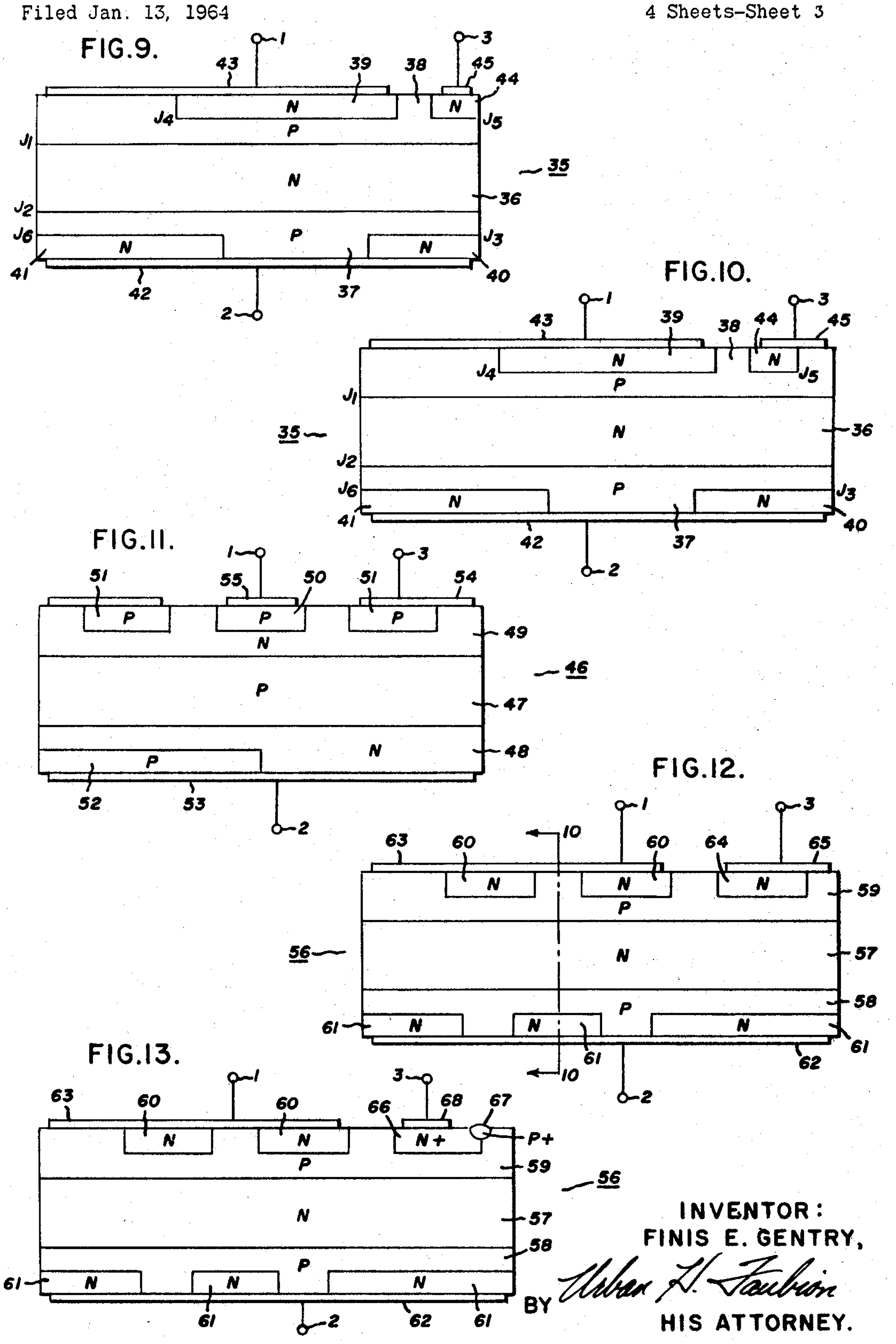

FIGURES 7, 8 and 9 are diagrammatic sectional views of another embodiment of a three-lead bilateral switch constructed in accordance with principles of the present invention, FIGURES 8 and 9 having symbols used in explaining stages of conditions for turning the device on; and FIGURES 10 through 17 are diagrammatic sectional views illustrating other embodiments of three terminal bilateral semiconductor switches which employ principles of the present invention.

The devices illustrated and described herein are all bilateral controllable semiconductor switches and all have three terminals 1, 2 and 3 which are intended to be connected in the circuit where the switch is employed. In each case, the upper and lower main current carrying terminals 1 and 2 respectively are connected in a main current carrying path of the circuit and gating terminal 3 is connected to a source which supplies a turn-on signal of proper polarity when the current path between the main terminals 1 and 2 is to be rendered highly conductive.

For the device of FIGURES 1, 2, 3 and 4, when upper main terminal 1 is positive or negative relative to lower main terminal 2, the device is turned on by applying a turnon voltage at gate terminal 3 which is positive relative to the upper main terminal 1.

In the embodiment illustrated in FIGURES 1 through 4, the semiconductor pellet 10 has an internal N conductivity type base region or layer 11 and P conductivity type outer regions or layers 12 and 13 on opposite sides. The two P type layers 12 and 13 perform different functions for conduction in opposite senses through the pellet 10. For example, when the lower main terminal 2 is positive relative to upper terminal 1, the lower (i.e. lower in the figures) P type region 12 operates as an emitter and the junction $J_2$ between the lower P type region 12 and internal N type region 11 is considered an emitter junction. Under these conditions, the upper P type region 13 constitutes a base region which is separated from the N type base region 11 by junction $J_1$. When the polarity between the main terminals is reversed, the upper P type region 13 constitutes an emiter and the lower P type region 12 constitutes a base layer.

An upper N conductivity type region or layer 14 is formed adjacent or contiguous with a portion of the internal P type base region 13 and is separated therefrom by junction $J_5$. As illustrated, N type region 14 is spaced from both sides (right and left in the figures) to leave room for contacts which are described later. When the lower device terminal 2 is positive relative to upper terminal 1, upper N type region 14 constitutes an emitter region and the adjacent junction $J_5$ an emitter junction. In order to provide a corresponding emitter and emitter junction for conduction in the opposite sense (i.e., upper terminal 1 to lower terminal 2), two separate lower N conductivity type regions 17 and 20 are formed adjacent or contiguous with a part of lower (outer) P type layer 12 and form rectifying junctions $J_3$ and $J_4$ (emitter junctions for this polarity). As illustrated, the lower N type regions 17 and 20 are formed at opposite edges of pellet 10 and are only contiguous with a part of the lower P type region 12. The N type regions 17 and 20 are positioned to leave an exposed surface area of the P type region 12 (designated by the numeral 21 in the figures). More importantly, the lower N type regions 17 and 20 are positioned so that a portion of each is directly opposite (under in the figures) a portion of upper N type emitter region 14 to form overlap regions for conduction purposes. These regions are designated as "Overlap A" and "Overlap B." Further, the position and dimensions of lower N type emitter regions 17 and 20 are adjusted so that the exposed part 21 of lower P type region 12 is opposite a portion of upper N type emitter region 14 again to form an overlap region (overlap D) for conduction purposes. It is also important that the lower N type emitter 20 extends so that it overlaps (overlap C) an exposed portion of upper P type region 13 for conduction purposes.

The contacts for the main current conduction path through the device is made by providing a low resistance ohmic contacts 15 and 16 on the lower and upper major faces respectively of the pellet 10. The lower electrode or contact 15 extends across the lower face of the pellet 10 and contacts the lower external N type region 20, the exposed portion of the next adjacent (lower) P type layer 12 and lower N type emitter region 17, contact 15 and thus shorts both junction $J_3$ and $J_4$. The upper electrode 16 extends over the external N type region 14 and the exposed portion of upper P type region 13 which overlaps the lower external N type emitter region 20. In other words, upper electrode 16 extends over upper external N type region 14 and the portion of upper P type region 13 in overlap region C. Thus, upper electrode 16 shorts the upper emitter junction $J_5$. The electrodes 15 and 16 are electrically connected to main terminals 2 and 1 respectively. If the lower emitter region 17 were omitted, the device thus far described would constitute a five-layer device with upper and lower shorted emitter and thus constitutes a five-layer two-lead bilateral switch as described in the Holonyak et al. copending patent application supra and the R. W. Aldrich and N. Holonyak, Jr. article, "Two-Terminal Asymmetrical and Symmetrical Silicon Negative Resistance Switches," in Journal of Applied Physics, vol. 30, No. 11, pp. 1819–1924, November 1959.

In order to provide gate control, a gate electrode 18 is provided on pellet 10 directly to the upper P type layer 13 adjacent the external N type layer or region 14 but on the opposite side of the zone from the region where the main electrode 16 extends over to contact upper P type region 13. Since the distance from gate electrode 18 through P region 13 under the external N type region 14 to the portion of main electrode 16 on the P region 13 is sufficient to provide a high resistance path, the two electrodes are considered electrically or conductively remote. Gate electrode 18 is connected to gate terminal 3 to provide external gate control.

Figures 1, 2, 3, 4:
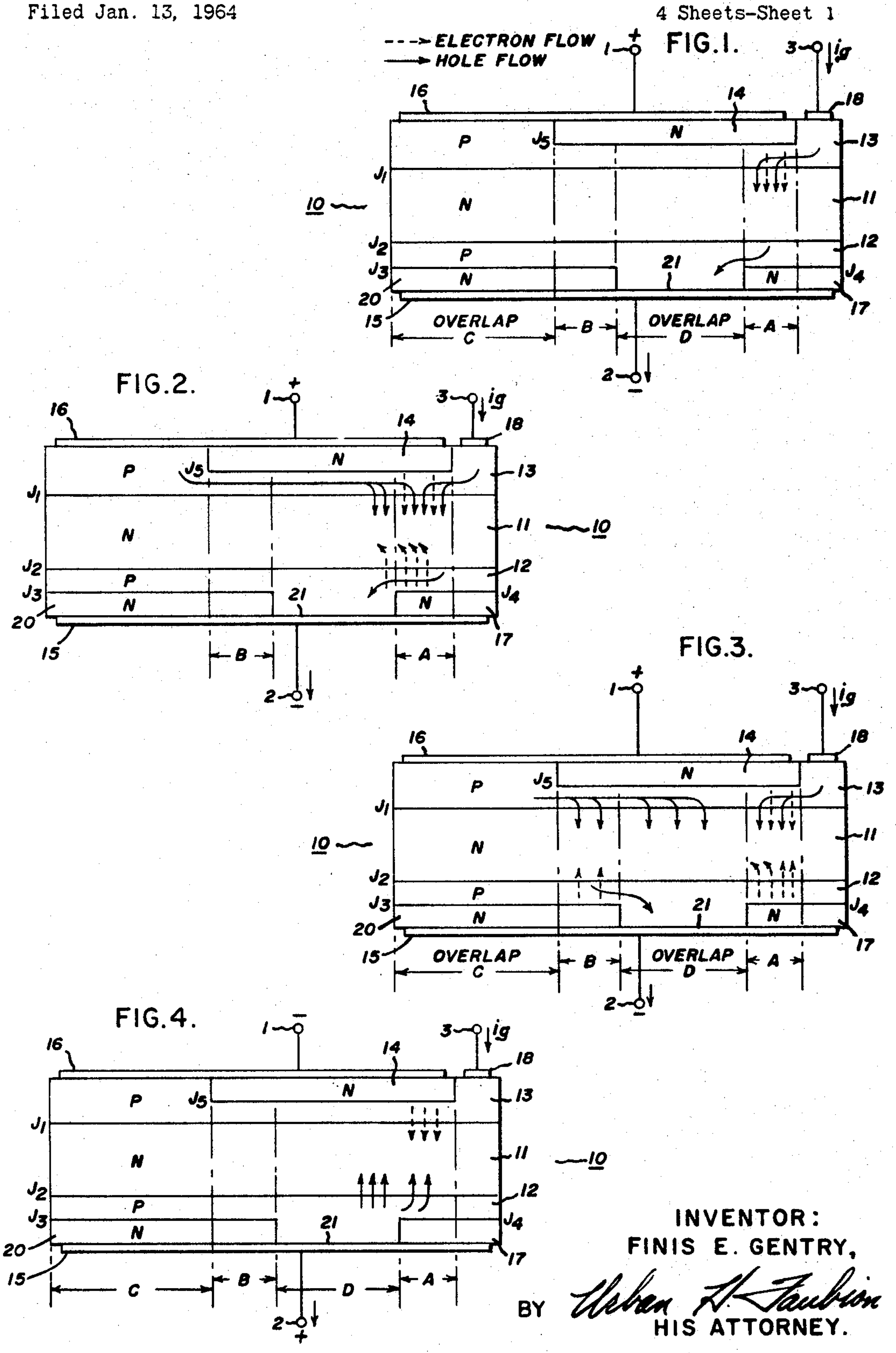

In order to understand how the device of FIGURES 1 through 4 operates (at least one mode), consider that the device as illustrated in FIGURE 1 is in the blocking state with positive voltage applied to electrode 16. By applying a positive voltage to the gate terminal 3 (see FIGURE 1) the potential of upper P type layer 13 is raised with respect to upper N type emitter region 14 in the vicinity of the portion of emitter junction $J_5$ near the gate electrode 18 (see region of junction $J_5$ in the area of overlap A in FIGURE 1). As a consequence, electrons are injected from the upper emitter 14 into adjacent base region 13 and diffuse toward internal collector junction $J_1$ (see arrows for electron flow). Those electrons collected at junction $J_1$ lower the potential of the internal N type base region 11 relative to adjacent P type base layer 13 causing injection of holes into N type region 11. The holes diffuse toward the next lower junction $J_2$ and those collected flow toward the lower main electrode 15. The resulting hole current flow (see solid arrows in FIGURE 1) creates a voltage drop which causes the lower N type region 17 in overlap region A to inject electrons into the adjacent P type region 12 when the hole current reaches a sufficient magnitude for the lower junction $J_4$ to be favorably (forward) biased by a few tenths of a volt. The degree of bias of this junction $J_4$ is proportional to the sheet resistance of adjacent lower P type base region 12 and also by the amount of overlap in overlap region A.

With lower junction $J_4$ in forward bias, lower adjacent N type region 17 injects electrons into adjacent lower P type region 12 (see overlap A region FIGURE 2) where they diffuse toward internal junction $J_2$. Those electrons collected at junction $J_2$ lower the potential of internal N type region 11 with respect to adjacent upper P type region 13 in overlap region A and cause additional holes to be injected from P region 13 into internal N type region 11. Thus, the device begins to turn on in overlap region A. However, as current $i_g$ begins to build up through the gate lead (terminal 3) the voltage in the external gate circuit (not shown) rises causing hole current to flow from the overlap region A of lower P type region 12 laterally toward the shorted region 21. This results in an increased voltage being applied across junction $J_4$ so that it injects electrons into region 12 where they diffuse toward internal junction $J_2$. Thus, the structure in overlap region A consisting of upper P type region 13, internal N type region 11, lower P type region 12 and lower N type region 17 begins to turn on with internal junction $J_2$ acting as a collector for electrons injected by lower N type region 17 which diffuse across lower P type region 12. As junction $J_2$ (which initially is in a blocking state for the applied voltage polarity considered here) starts to switch the electrons injected from lower N type emitter 17 into adjacent P type region 12 increase and thus the collected electron current which flows into internal N type base region 11 increases causing further drop in potential of this region relative to upper P type region 13. The sheet resistance of upper P type region 13 is made high enough so that holes are also injected from this region into internal N type region 11 in overlap region B (see FIGURE 3) where they diffuse across region 11 and are collected at internal junction $J_2$; thus, raising the potential of lower P type region 12 relative to lower N type emitter region 20 (in overlap region B) which causes electrons to be injected from region 20 into adjacent (lower) P type region 12. By this process, that part of the device in overlap region C becomes conductive. Conductivity modulation aids this process by lowering the resistance of internal N type base layer 11.

The above description explains one way the device of FIGURES 1, 2, 3 and 4 switches from its high impedance state between main terminals 1 and 2 to its low impedance state for a potential which is positive at upper main terminal 1 relative to that at terminal 2. For an understanding of a turn-on mechanism with the opposite polarity of applied voltage (i.e. positive at lower terminal 2 relative to upper terminal 1) consider FIGURE 4. For this mode of operation, the device operates much as a conventional SCR and overlap region D is the dominant device current path.

A voltage applied between main terminals 1 and 2 which is positive at lower main terminal 2 relative to upper terminal 1 presents a positive potential at lower P type emitter layer 12 and a negative potential at the upper N type emitter layer 14. The two junctions $J_2$ an $J_5$ adjacent the two end layers (P layer 12 and N layer 14) tend to conduct since the positive potential at P type layer 12 tends to cause P type carriers to move across emitter junction $J_2$ for collection at the internal junction $J_1$ and the negative potential at the N type emitter 14 tends to cause the negative carriers to move across emitter junction $J_5$ for collection at internal junction $J_1$. The internal junction, $J_1$, between the N and P type layers 11 and 13, however, tends to block current flow through the device. The device, like any four-layer device, can be made to conduct by raising the voltage across it to some high value (breakover voltage) which forces conduction across the internal junction $J_1$. It may also be made to conduct by introducing the proper amount of current through gate electrode 18 on the upper P type intermediate layer 13 to cause a change of the charge condition across internal junction $J_1$. That is, a voltage applied to gate terminal 3 which is positive relative to upper main terminal 1 causes the upper N type layer (emitter here) 14 to inject electrons into upper P type region 13 (base region here). The electrons are not injected uniformly across the area of the upper emitter junction $J_5$ because the injected electron current density varies exponentially with the voltage between the P and N type layers 13 and 14 respectively on opposite sides of the junction. Since the potential across the junction $J_5$ results from flow of majority carriers (holes in this case) from the gate contact 18, a lateral voltage drop (along the junction $J_5$) occurs in the P type base region 13. Thus, the voltage between the two adjacent regions 14 and 13 is highest near the gate contact 18 and decreases with lateral distance away from it.

The injected electrons diffuse toward internal junction $J_1$ and those collected lower the potential of the internal N type base region 11 relative to the lower P type region 12 (emitter for this section) in the region opposite the electron injection. As a consequence, holes are injected from the lower P type region 12 into internal N type base region 11 and diffuse toward internal junction $J_1$. The holes collected at junction $J_1$ raise the potential of upper P type layer 13 relative to the internal N type layer 11 causing further injection of electrons from upper N type region 14 into the adjacent P type region 13. As holes in upper P type region 13 build up the voltage between this region and upper N type region 14 increases, and lateral flow of hole current causes more of P type layer 13 to be positive with the result that more of the area of upper emitter 14 injects electrons. A similar state of affairs occurs in the internal N type base layer 11.

The buildup of mobile charge in the two internal base regions 11 and 13 causes the space charge layer at the internal junction $J_1$ to collapse and results in additional current through the device (and load). Thus, this positive feedback process continues in overlap region D until it turns on over this entire region.

Figure 5:
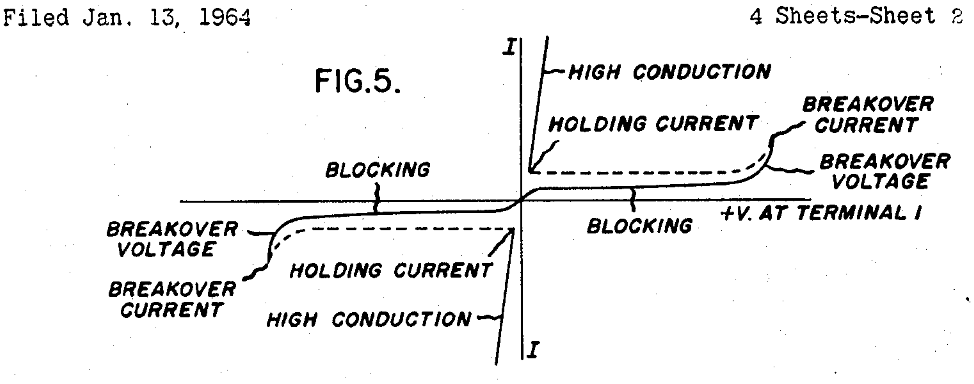
FIGURE 5 is a graph showing voltage-current characteristics of the device of FIGURES 1 through 4 inclusive with device current plotted along the axis of ordinates and device voltage plotted along the axis of abscissas.

Thus, for an alternating voltage applied between main terminals 1 and 2, the device switches for both polarities when a voltage is applied between gate terminal 3 and upper main terminal 2 which is positive at the gate terminal 3 (relative to terminal 2). FIGURE 5 illustrates typical voltage/current characteristics of the device illustrated in FIGURES 1–4. Current is plotted along the axis of ordinates and voltage along the axis of abscissas with increasing positive voltage on terminal 1 plotted to the right and increasing positive voltage on terminal 2 plotted to the left and positive current flow considered as flow from terminal 1 to 2. In the forward blocking direction positive voltage on main terminal 1 relative to 2, increasing the potential does not appreciably increase the device current until the voltage breakover point is reached. Beyond this point, device current increases rapidly until the device goes into its high conduction mode. For the reverse voltage between main terminals 1 and 2 (positive at terminal 2 relative to terminal 1), the device characteristics are, for all practical purposes, the same as described above but shifted 180°. In other words, certain regions of the pellet 10 conducts for positive voltage at terminal 1 relative to terminal 2 and described above whereas other regions conduct for the reverse polarity. This is reflected by the fact that the total device voltage current characteristics are the same in the first and fourth quadrants of the graph of FIGURE 5. Thus, the device is not only bilateral (conducts for both polarities of voltage between main terminals 1 and 2) but also essentially symmetrical.

For increasing values of gate current, the region of characteristics between breakover current and holding current is narrowed and the breakover voltage reduced. For sufficiently high gate currents, the entire blocking region is removed in both the first and fourth quadrants of the characteristics, and the device has the voltage-current characteristics of a pair of parallel and oppositely poled PN rectifiers.

One practical way to construct the pellet 10 and one which lends itself to techniques used on SCR production lines is to start with silicon of N conductivity type having a resistivity of 1 to 5 ohm-centimeters (impurity concentration of about $(10)^{15}$ atoms/cc.) that ultimately forms the internal N type base layer 11. The initial pellet 10 of FIGURE 1 is 300 mils square and a thickness of approximately 7 mills. The pellet is gallium diffused to a depth of about 1 mil so that outer P conductivity layers are formed on both sides of the N type layer 11. The P type layer on one side ultimately forms part of the lower P type layer 12, and the other P type layer so formed ultimately forms the upper P type layer 13.

To complete the pellet 10, it is masked on both sides by conventional masking techniques as, for example, with silicon dioxide. A portion of the oxide mask is removed from the lower major face of the pellet to expose two portions of the lower P type layer 12 for lower external emitter regions 17 and 20. A portion of the oxide mask is also removed from the upper surface of pellet 10 to expose a portion of the upper P type layer 13 directly above the portion of the lower face which is masked to leave the exposed region 21. This exposed portion on the upper face extends over a portion of both the exposed regions on the lower face. This region on the upper face is exposed for formation of the upper N type region 14 which acts as an upper emitter. The portion of pellet 10 exposed for formation of lower emitter region 17 is approximately 60 mils by 300 mils, the portion exposed for upper N type region 14 may be approximately 150 mils by 300 mils and spaced 40 mils from the pellet edge (right looking at the drawings) so that it overlaps the region exposed for lower external region 17 20 mils (from the view shown) by 300 mils (into the paper). The portion exposed for lower N type region 20 may be 120 mils by 300 mils so that it also overlaps upper N type region 14 20 mils by 300 mils. The pellet is then phosphorous diffused to a depth of about 0.5 mil to form the upper N type layer 14 and lower N type layers 17 and 20.

Appropriate contacts (15, 16 and 18 of FIGURES 1–4) are applied by conventional techniques. Here the contacts are all formed by deposition of electroless nickel.

In FIGURES 6, 7 and 8, another embodiment of a controllable three lead bilateral switch is illustrated. The three internal regions of the pellet 25 are essentially the same as are the corresponding regions of the device of FIGURES 1–4. That is, the semiconductor pellet 25 has an internal N conductivity type base region or layer 26 P conductivity type regions or layers 27 and 28 on opposite sides. The two outer P type layers 27 and 28 perform different functions for conduction in opposite senses through the pellet 10. For example, when the lower main terminal 2 is positive relative to upper terminal 1, the lower (i.e. lower in the figure) P type layer 27 operates as an emitter and the junction $J_2$ between the lower P type layer 27 and internal N type layer 26 is considered an emitter junction. Under these conditions, the upper (internal) P type rigion 28 constitutes a base region which is separated from the N type base region by junction $J_1$. When the polarity between the main terminals is reversed, the upper P type layer 28 constitutes an emitter and the lower P type layer 27 constitutes an internal base region.

An upper (external) N conductivity type region or layer 29 is formed adjacent or contiguous with a portion of the internal P type base layer 28 and is separated therefrom by junction $J_4$. When the lower device terminal 2 is positive relative to upper terminal 1, upper N type region 29 constitutes an emitter region and the adjacent junction $J_4$ an emitter junction. In order to provide a corresponding emitter and emitter junction for conduction in the opposite sense (i.e., upper terminal 1 to lower terminal 2), a lower N conductivity type region 30 is formed adjacent or contiguous with a part of lower P type layer 27 and forms a rectifying junction $J_3$ (emitter junction for this polarity). The lower N type region 30 is only contiguous with a part of the lower P type region 27 and is positioned to leave an exposed surface area of the P type region 27 under the opposite external N type region 29 and to extend under a portion of region 29. With this arrangement lower N type region 30 overlaps both a portion of upper N type external region 29 (overlap region F) and a portion of the exposed surface of upper P type region 28 (overlap region E) for conduction purposes. Also, upper external N type region 29 overlaps the exposed portion of lower P type region 27 (overlap region G).

The contacts for the main current conduction path through the device is made by providing low resistance ohmic contacts 31 and 32 on the lower and upper major faces respectively of the pellet 25. The lower electrode or contact 31 contacts the lower external N type region 30 and an exposed portion of the next adjacent (lower) P type layer 27 and thus shorts the junction $J_3$. The upper electrode 32 extends over the external N type layer 29 and the exposed portion of upper P type layer 28 and thus shorts the upper junction $J_4$. The electrodes 31 and 32 are electrically connected to main terminals 2 and 1 respectively.

In order to provide gate control, an N type gate region 33 is provided adjacent to the portion of upper P type layer 28 near to the main electrode (shorting contact) 32 and a low resistance ohmic contact or electrode 34 is formed on the gate region 33 in order to provide a means of electrical connection to gate terminal 3. Formation of the N type gate region 33 adjacent or in upper P type emitter region 28 provides a rectifying junction $J_5$ therebetween. This gate region 33, in effect, forms a transistor with upper P type region 28 and N type base region 26 which includes junction $J_5$ and $J_1$.

In order to understand the operation of the device, first assume a voltage applied between main terminals 1 and 2 which is positive at terminal 1 relative to terminal 2. This condition presents a positive potential at upper P type emitter layer 28 and a negative potential at the lower N type emitter layer 30. Consider primarily region E. The junctions $J_1$ and $J_3$ tend to conduct since the positive potential at P type layer 28 tends to cause P type carriers to move across emitter junction $J_1$ for collection at the internal junction $J_2$ and the negative potential at the lower N type emitter tends to cause the negative carriers to move across lower emitter junction $J_3$ for collection at internal junction $J_2$. The junction, $J_2$, between the N and P type layers 26 and 27, however, tends to block current flow through the device. The device can be made to conduct by raising the voltage across it to some high value which forces conduction across the internal junction $J_2$. It may also be made to conduct by extracting the proper amount of current through the gate terminal 3 on the upper N type gate region 33 to cause a change of the charge condition across the blocking junction $J_2$. That is, a voltage applied to gate terminal 3 which is negative relative to upper main terminal 1 causes the N type gate region 33 (emitter here) to inject electrons into P type region 28. The injected electrons diffuse and are collected at junction J, which lowers the potential of internal N type base region 26 relative to upper adjacent P type region 28 so that holes are injected from region 28 to region 26. These holes diffuse across the internal N type region 26 and are collected at the next lower junction $J_2$ (blocking). This raises the potential of lower P type region 27 relative to lower external N type emitter 30 causing electrons to be injected from emitter 30 into lower P type region 27. These electrons diffuse toward the next upper junction $J_2$ where those collected lower the potential of internal N type base 26 with respect to upper P type region 28 so that more holes are injected into N type region 26 by adjacent P type region 28. This process continues regeneratively until the device turns on. This turn-on mechanism is called "remote gate turn-on" and will be referred to as such later in the description.

For the other polarity applied between main terminals 1 and 2, i.e. lower terminal 2 positive relative to terminal 1, the device operates by a mechanism which is referred to as a "junction gate." For an understanding of this mechanism, refer first to FIGURE 7. Electrons are injected from upper gate region 33 with the application of a negative bias at gate terminal 3 (and hence gate electrode 34). This injection is designated by the broken arrows in FIGURE 7. The region of the pellet 25 immediately under the gate region 33 (i.e. in overlap region 14) begins to turn on with the result that a lateral voltage drop develops in lower P type region 27 immediately above low N type emitter region 30 due to hole current flow in this region (see solid arrows of FIGURE 7). The lateral voltage drop results in injection of holes from lower P type region 27 into internal N type region 26 over the entire lower N type emitter region 30 (see solid arrows in overlap regions F, E and H of FIGURE 8). These holes diffuse across internal N type region 26 toward the junction $J_1$ immediately above this region (above in the figure) and between internal N type region 26 and upper P type region 28. Those holes collected in the overlap region E (i.e. the exposed portion of upper P type region 28 which is contacted by upper main electrode 32 and which overlaps lower N type emitter region 30 for conduction purposes) and in region F contribute to the main load current. However, the holes collected at $J_1$ in the adjacent overlap region F (region where upper and lower N type emitter regions 29 and 30 overlap for conduction purposes) create a lateral bias in upper P type region 28 which forward biases junction $J_4$ (that junction immediately under upper N type emitter region 29) and causes it to inject electrons into the adjacent upper P type region 28 (see FIGURE 8) where those that are collected at the next lower junction $J_1$ lower the potential of internal N type region 26 with respect to lower P type region 27 causing holes to be injected back into N type region 26 (from lower P type region 27). Thus, the regenerative feedback mechanisms for turn on has begun in overlap region F and spreads to overlap region G (that region where upper N type tmitter 29 overlaps the exposed portion of lower P type region 30 which is contacted by lower main electrode 31).

Thus, the device of FIGURES 6, 7 and 8 will turn on with a negative bias applied to gate electrode 3 when upper main electrode 1 is either positive or negative relative to lower main electrode 2. The resulting device characteristics with an alternating voltage applied between main terminals 1 and 2 is that shown and described relative to FIGURE 5.

The device of FIGURES 6, 7 and 8 is constructed by techniques which are essentially the same as those described for the device of FIGURES 1, 2 and 3. For this reason, the method of construction is not repeated here.

The device of FIGURE 9 is one which can be turned on with either a negative or positive bias (gate current) relative to upper main electrode 1. Thus, if lower main electrode 2 is either positive or negative relative to upper main electrode 1, either a positive or negative gate current will trigger the device into conduction.

The device of FIGURE 9 has constructional features which are common to the previously described devices, as do all subsequently described devices. However, in order to avoid confusion between figures, each structure is described separately and separate reference numerals are given the parts of the devices except for the main terminals 1 and 2 and gate terminals.

In the embodiment illustrated in FIGURE 9, the semiconductor pellet 35 may be considered a five-layer device and has an internal N conductivity type base region or layer 36 and P conductivity type regions or layers 37 and 38 on opposite sides. As for the devices previously described, the two P type layers 37 and 38 perform different functions for conduction in opposite senses through the pellet 35. Again, for example, when the lower main terminal 2 is positive relative to upper terminal 1, the lower (i.e. lower in the figure) P type layer 37 operates as an emitter and the junction $J_2$ between the lower P type layer 37 and internal N type layer 36 is considered an emitter junction. Under these conditions, the upper (internal) P type region 38 constitutes a base region which is separated from the N type base region by junction $J_1$. When the polarity between the main terminals is reversed, the upper P type layer 38 constitutes an emitter and the lower P type layer 37 constitutes an internal base layer.

An upper N conductivity type region or layer 39 is formed adjacent or contiguous with a portion of the internal P type base layer 38 and is separated therefrom by junction $J_4$. As illustrated, this N type region 39 is spaced from both pellet edges. When the lower device terminal 2 is positive relative to upper terminal 1, upper N type region 39 constitutes an emitter region and the adjacent junction $J_4$ an emitter junction. In order to provide a corresponding emitter and emitter junction for conduction in the opposite sense (i.e., upper terminal 1 to lower terminal 2), a pair of lower N conductivity type regions 40 and 41 are formed adjacent or contiguous with a part of lower P type layer 37 and form rectifying junctions $J_3$ and $J_6$ respectively (emitter junctions for this polarity). The lower N type regions 40 and 41 are only contiguous with a part of the lower P type region 37 and are spaced apart to leave an exposed surface area of the lower P type region 37 under the upper N type external emitter region 39. Thus, upper N type region 39 overlaps the exposed portion of lower P type region 37 for conduction purposes. Further, the lower N type emitter regions 40 and 41 have portions which extend under a portion of upper N type region 39 and other portions which are opposite exposed portions of upper P type region 38 to form overlaps for conduction purposes.

The contacts for the main current conduction path through the device are made by providing low resistance ohmic contacts 42 and 43 on the lower and upper major faces respectively of the pellet 35. The lower electrode or contact 42 contacts both the lower external N type regions 40 and 41 and the exposed portion of the next adjacent (lower) P type layer 37. Thus, lower electrode 42 shorts the junction $J_3$ and $J_6$. The upper electrode 43 extends over the external N type layer 39 and the exposed portion of upper P type layer 38 which is over lower N type region 41 and thus shorts the upper junction $J_4$. The electrodes 42 and 43 are electrically connected to main terminals 2 and 1 respectively.

In order to provide gate control, an N type gate region 44 is provided adjacent to the portion of upper P type layer 38 and near the upper external N type emitter region 39 but on the opposite side of the region from where the upper main electrode 43 extends over to connect to upper P type layer 38. A low resistance ohmic contact or electrode 45 is formed on the gate region 44 in order to provide a means of electrical connection to gate terminal 3.

When the gate terminal 3 is made negative (negative gate current, i.e. current out at gate terminal 3) relative to upper main electrode 1 and upper electrode 1 either positive or negative relative to lower electrode 2, the structure behaves as described for the device of FIGURES 6, 7 and 8. When a positive voltage is applied between gate terminal 3 and upper main electrode 1 the device turns on when the avalanche voltage of the gate junction $J_5$ is exceeded. Once the breakdown of gate junction $J_5$ takes place, the turn on mechanism is that described for the device of FIGURE 1 (previously described).

The device of FIGURE 10 is so similar to that of FIGURE 9 that corresponding parts of the two devices are given like reference numerals. The difference between the two devices is that the gate electrode 45 extends to contact an exposed portion of upper P type region 38 and thus short gate junction $J_5$. Note that the gate short is remote from the short connection to upper P type region 38 made by the upper main electrode 43. The object in making these two connections remote is to provide a relatively high resistance between electrodes 43 and 45 (hence main terminal 1 and gate terminal 3) and thus prevent an electrical short between them.

The device of FIGURE 10 operates precisely as does the device of FIGURE 9 except for the condition where a positive voltage is applied between gate terminal 3 and upper main terminal 1. For this condition the turn on mechanism for the device of FIGURE 10 is the same as a conventional gate SCR for voltages which may be lower than the avalanche voltage of gate junction $J_5$. The gate electrode which shorts the gate junction $J_5$ provides this action.

The device thus far described may be considered NPNPN structures, at least, the three center regions of these devices are PNP in that order and the external regions for the devices are N type. The duals of these structures (and all subsequent structures) are also operative. By "dual" we mean structures which are identical in every respect to the structure shown but the conductivities of the corresponding regions of the devices are of opposite types and the voltage-current characteristics of the individual segments as illustrated in FIGURE 5 are rotated 180°.

These devices (duals) may be made by similar techniques and the same general principles apply. Therefore, an elaborate discussion of the operation and structure of the dual is not given here. However, it is noted that to make this device, the initial wafer or pellet is of conductivity type material which ultimately forms an internal P type base region. Outer N type regions are formed on opposite sides of the type region as described relative to regions 12 and 13 of the device of FIGURES 1, 2 and 3 but, of course, N type impurity (such as phosphorous) is used. Finally, the P type emitter layers and where appropriate a P type gate region may be diffused in by boron diffusion. Contacts are then applied by conventional techniques as described above.

An example of an "opposite" type structure is given in FIGURE 11. This device is not the dual of any of the previous devices but illustrates the principle. Here, the initial wafer or pellet 46 is of P conductivity type material which ultimately forms the internal P type base region 47. The lower and upper N type regions 48 and 49 respectively are diffused as described relative to regions 12 and 13 of the device of FIGURE 1, but, of course, N type impurity (such as phosphorous) is used. Finally, the upper P type gate region 50 (in the center), upper type emitter region 51 (which here is annular) and lower P type region 52 may be diffused in by boron diffusion. As illustrated, the upper P type emitter region 51 surrounds the gate region 50 and is annular. This construction provides an overlap of both a portion of the upper P type emitter region 51 and gate region 50 with part of the exposed portion of lower N type region 48 and also with a part of the lower P type emitter region 52. Contacts are then applied by conventional techniques as described above. For this structure, a lower shorting contact 53 (lower main electrode) is applied to lower P region 52 and N type region 48, an upper shorting contact 54 (upper main electrode) is applied to upper P type emitter region 51 and N type region 49. In the embodiment illustrated upper main electrode is annular and extends out over the exposed portion of upper N type region 49 away from gate region 50. In order to provide control, contact 55 is applied to the gate region 50. Upper and lower main terminals 1 and 2 are connected to the upper and lower main electrodes 54 and 53 respectively and gate terminal 3 is connected to the center gate electrode 55.

It will be readily appreciated that the device structure provides overlaps and conduction paths which correspond to those of the device of FIGURE 9. Making due allowance for the fact that N and P type regions of the device of FIGURE 9 are replaced by the opposite regions in FIGURE 10, the two device operating mechanisms are similar. Both devices can be turned on with main electrode 1 either positive or negative relative to lower main electrode 2 with either a positive or negative gate current.

One way to obtain increased current carrying capability for the device described is to enlarge the semiconductor pellet and provide additional judiciously located external emitter regions. Such an arrangement is illustrated in FIGURE 12. This device is a refinement of the device of FIGURE 10 and operates in the same manner. The structure can be turned on with either a negative or positive gate bias (referred to upper main terminal 1) for upper main terminal 1 either negative or positive with respect to lower main terminal 2.

In the embodiment illustrated in FIGURE 12, the semiconductor pellet 56 has an internal N conductivity type base region or layer 57 and P conductivity type regions or layers 58 and 59 on opposite sides.

Upper external N conductivity type emitter regions 60 are formed adjacent or contiguous with a portion of the upper P type base layer 59 and are separated therefrom by rectifying junctions. In order to provide corresponding emitters and emitter junction for conduction in the opposite sense (i.e., upper terminal 1 to lower terminal 2), three lower N conductivity type regions 61 are formed adjacent or contiguous with a part of lower P type layer 58 and forms rectifying junctions (emitter junctions for this polarity). The lower N type regions 61 are only contiguous with a part of the lower P type regions 58 and are spaced apart to leave exposed surface areas of the P type region 58. The upper and lower regions 60 and 61 are located so that each one of the upper regions 60 are above (overlap for conduction purposes) a portion of two of the lower regions 61 and also over (overlap) an exposed portion of lower P type region 58. This arrangement makes it easier to turn the device on over the entire pellet 56.

The contacts for the main current conduction path through the device is made by providing low resistance ohmic contacts 62 and 63 on the lower and upper major faces respectively of the pellet 56. The lower electrode or contact 62 contacts all of the lower external N type regions 61 and the exposed portions of the next adjacent (lower) P type layer 58 and thus shorts the junctions between these regions. The upper electrode 63 extends over both of the external N type regions 60 and the exposed portions of upper P type layer 59 between these regions and to the left of the pellet 56 (as illustrated).

Lower and upper electrodes 62 and 63 are connected to main terminals 2 and 1 respectively.

In order to provide control, an N type gate region 64 is provided adjacent to the portion of upper P type layer 59 near to an N type emitter region 60 but spaced from it and spaced from the pellet edge. A low resistance ohmic contact or electrode 65 is formed on the gate region in order to provide a means of electrical connection to gate terminal 3. The gate electrode 65 also extends out over a portion of upper P type region 59 on the opposite side of the gate region 64 from where the main electrode 63 extends over to connect to upper P type layer 59. The object in making the two connections to upper P type regions 59 remote is to provide a relatively high resistance between terminals 1 and 3 and thus prevent an electrical short between them. Since the distance from gate electrode 65 through P region 59 under the external N type gate region 64 and external N type emitter region 60 to the portion of main electrode 63 is sufficient to provide a high resistance path, the two electrodes 65 and 63 are, therefore, considered electrically or conductively remote.

It will be noted that the part of the structure to the right (in the figure) of section line 10—10 is for all practical purposes identical to the device of FIGURE 10. The turn on mechanism for the two structures is the same, therefore, turn on for the device of FIGURE 12 is not repeated here.

A modification of the device of FIGURE 12 which permits a smaller gate emitter region is illustrated in FIGURE 13. Since the structures are so similar corresponding parts are given like numerals. The only difference between the two structures is found at the gate regions and gate electrodes, therefore, these elements are given different reference numerals in FIGURE 13.

In this embodiment, a highly doped upper N type gate region 66 is provided which corresponds to gate region 64 of the device of FIGURE 12 except that a portion of the junction between gate region 66 and upper P type region is made highly doped with P type material (designated 67 on drawing). Provision of this region provides a tunnel junction straddling a portion of the junction. Actually the region need not be degenerate but may only be doped to provide the characteristics of the so-called backward diode.

With this arrangement, the gate electrode 68 is only connected to the gate region 66.

The device operates in the same manner as the device of FIGURE 12. For this reason, the operating mechanism will not be described again here.

Other useful embodiments result if a diode (negative resistance device) is placed on the gate region of the devices discussed. This can be done by making the diode a part of the pellet structure or providing a separate pellet for the diode and placing it in ohmic contact with a gate region. Examples of such devices are found in FIGURES 14, 15, 16 and 17.

Figures 14, 15, 16:
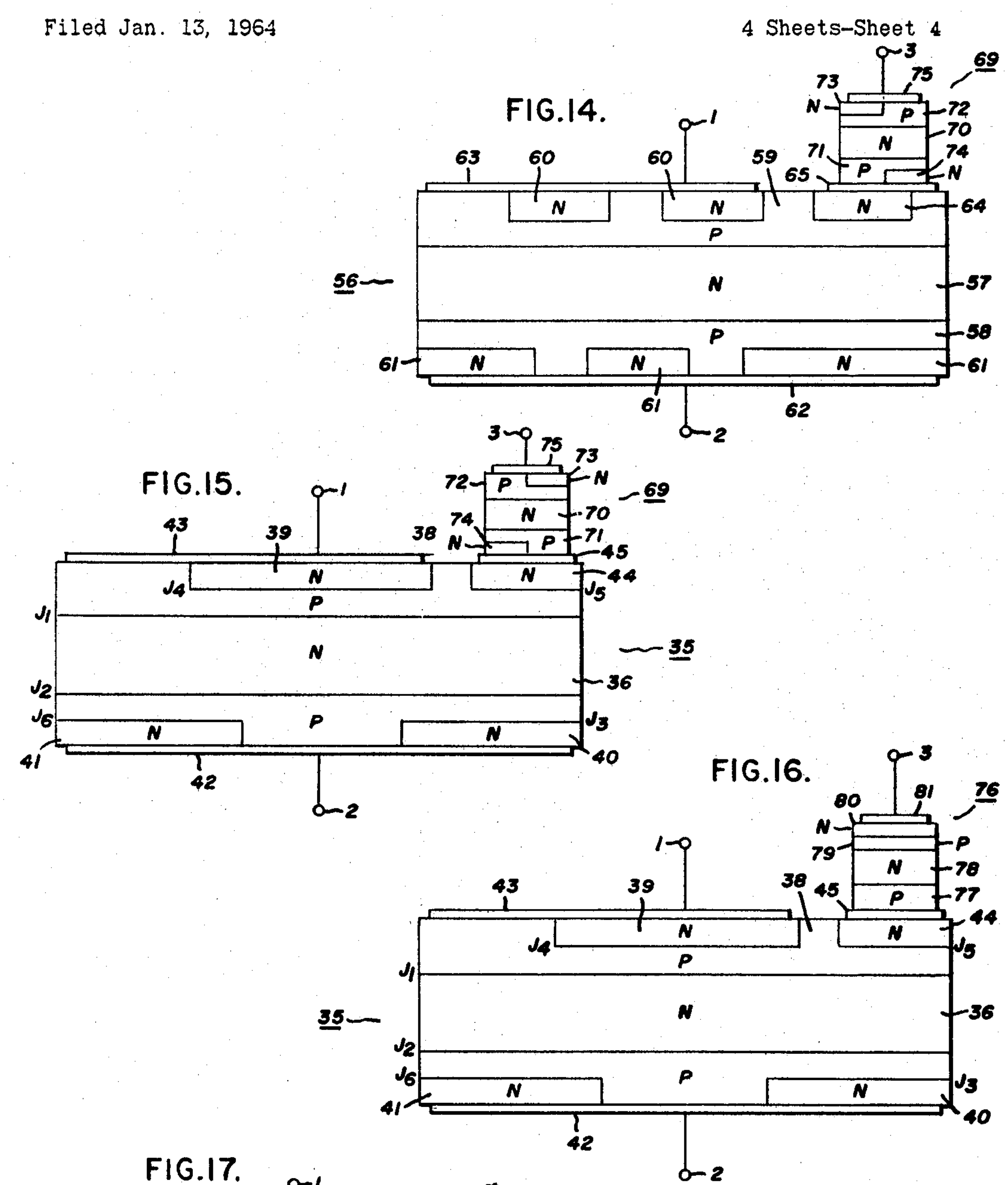

In the device of FIGURE 14, a two lead voltage triggered bilateral switch 69 constitutes the diode placed on gate electrode 65 of the device of FIGURE 15. Since the only new element in FIGURE 14 is the two lead switch 69, corresponding parts of FIGURES 12 and 14 are given the same reference numerals and that part of the structure described with regard to FIGURE 15 is not described again. In operation, when the bilateral diode switch 69 is voltage triggered the total device is turned on regardless of the polarity applied between the main terminals 1 and 2.

The bilateral switch 69 illustrated is one described in the article by Holonyak and Aldrich in the Journal of Applied Physics supra and further described and claimed in the copending patent application, Ser. No. 838,504 entitled, Semiconductor Devices and Methods of Making Same, filed Sept. 8, 1959, in the name of Nick Holonyak, Jr., and Richard W. Aldrich and assigned to the assignee of the present application. It may be considered a five-layer device and has an internal N conductivity type base region or layer 70 and P conductivity type regions or layers 71 and 72 on opposite sides. An upper N conductivity type region or layer 73 is formed adjacent or contiguous with a portion of the internal P type base layer 72 and is separated therefrom by a rectifying junction. In order to provide a corresponding emitter and emitter junction for conduction in the opposite sense, a lower N conductivity type region 74 is formed adjacent or contiguous with a part of lower P type layer 71 and forms a rectifying junction therewith. Notice that both upper and lower N type regions 73 and 74 are only contiguous with a part of the adjacent P type regions and are spaced from the sides of the pellet 69 to leave exposed surface areas of the P type regions on both sides. Both upper and lower emitters 73 and 74 are shorted. Lower emitter 74 is shorted by placing the device in low resistance ohmic contact with gate electrode 65 on the main pellet 56 in such a manner that the electrode contacts both the emitter 74 and the adjacent P type region 71. Upper emitter is shorted by providing an electrode 75 in low resistance ohmic contact with upper emitter 73 and adjacent P type region 72. This electrode 75 is connected to gate terminal 3 to provide for gate control.

By adding a bilateral switch of the type just described (69 of FIGURE 14) at the gate location of the device of FIGURE 9 as illustrated in FIGURE 15, a device is obtained which can be turned on either direction with a gate voltage equal to or slightly greater than the breakdown voltage of the voltage triggered bilateral switch 69. Since the structure of main pellet 35 is identical to that of FIGURE 9 and the bilateral gate switch 69 is identical to that described in connection with FIGURE 14, corresponding parts are given the same reference numerals and the description of parts and operation is not repeated here.

Anothher diode or negative resistance device which operates well in the environment contemplated is illustrated in FIGURE 16 in conjunction with the gate region of the device of FIGURE 9. The parts of FIGURE 16 which correspond to parts of FIGURE 9 are given like reference numerals. The diode rectifier 76 provided on gate region 44 (actually on gate electrode 45) is a four layer voltage triggered device as described in an article by William Shockley and J. F. Gibbons, entitled "Introduction to the Four Layer Diode" which appears in the January/February 1958 issue of Semiconductor Products, pp. 9–13. The four layer device has (enumerating up from gate electrode 45) a lower P type layer 77, an adjacent internal N type layer 78, an internal P type layer 79 immediately above N type layer 78, and an upper N type layer 80 with an electrode 81 in ohmic contact therewith. This arrangement provides a voltage trigger characteristic for negative gate voltages (relative to electrode 1) due to the characteristics of the four layer PNPN switch 76.

Figure 17:
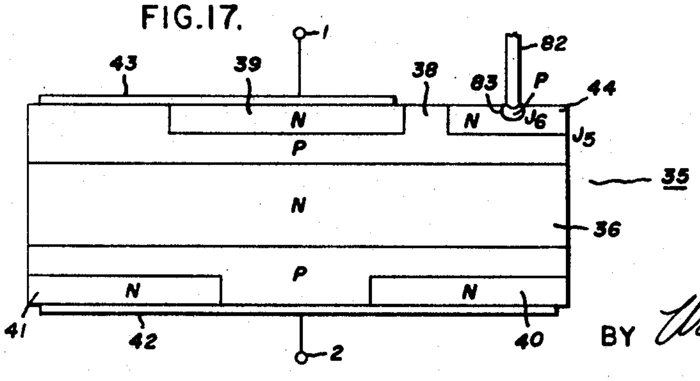

Still another way to introduce a negative resistance device into the gate circuit of a bilateral three lead switch is illustrated in FIGURE 17. Starting with the structure of FIGURE 9 (gate electrode 45) an aluminum gate lead 82 is pulsed into gate emitter region 44. This forms a P type region 83 adjacent N type gate region 44 with rectifying junction $J_6$ therebetween. This, in effect, makes a PNP avalanche transistor in the gate circuit which includes P type region 83, N type gate region 44 and upper P type region. With a positive voltage applied to the gate junction $J_5$ will avalanche when its avalanche breakdown voltage is reached; at that point, holes will be injected across junction $J_6$ and be collected at junction $J_5$. Thus, equivalently we have an avalanche transistor in the gate circuit of the device picture in FIGURE 1. If a negative voltage is applied to the gate lead $J_5$ is forward biased and $J_6$ reverse biased. When the breakdown voltage of $J_6$ is reached $J_5$ will become more forward biased and the device will behave equivalently as a Zener diode in series with the gate of FIGURE 9.

Many minor modifications in the structures and means of obtaining the structures can be proposed while not departing from the present invention. Thus, while particular embodiments are illustrated and particular methods of forming these embodiments are described, the invention is not limited thereto. It is contemplated that the appended claims will cover such modifications as fall within the true spirit and scope of the invention.

What we claim as new and desire to secure by Letters Patent of the United States is:

1. A bilateral controllable semiconductor switching device including a body of semiconductor material having three contiguous regions forming an internal region of one conductivity type and two outer regions of the opposite conductivity type, at least one external region of the one conductivity type provided adjacent a first one of the said outer regions, at least two spaced apart external regions of the one conductivity type provided adjacent a second one of said outer regions, said external regions being positioned in such a manner that a portion of each said outer regions is exposed and said two external regions have portions which overlap a portion of said one external region for conduction purposes, a first main current carrying electrode in low resistance ohmic contact with said one external region and an exposed portion of said first one of said outer regions which overlaps one of said two external regions for conduction purposes, a second main current carrying electrode in low resistance ohmic contact with said two spaced apart external regions and the intervening exposed portion of said second outer region, a single gate electrode conductively coupled to a portion of said first outer region adjacent to and on the opposite side of said one external region from the portion of said first outer region contacted by said first main electrode to provide a means for switching the device from its low to its high conductive state for voltages of either polarity across its main electrodes.

2. A bilateral controllable semiconductor switching device including a body of semiconductor material having three contiguous regions forming an internal region of one conductivity type and two outer regions of the opposite conductivity type, at least one external region of the one conductivity type provided adjacent a first one of the said outer regions, at least two spaced apart external regions of the one conductivity type provided adjacent a second one of said outer regions, said external regions being positioned in such a manner that a portion of each said two outer regions is exposed and said two external regions have portions which overlap a portion of said one external region for conduction purposes, a gate region of said one conductivity type adjacent a portion of said first one of said outer regions and positioned opposite at least a portion of one of said two external regions to form an overlap therewith for conduction purposes, a first main current carrying electrode in low resistance ohmic contact with said one external region and an exposed portion of said first one of said outer regions which overlaps one of said two external regions for conduction purposes, a second main current carrying electrode in low resistance ohmic contact with said two spaced apart external regions and the intervening exposed portion of said second one of said outer regions, and a gate electrode in low resistance ohmic contact with said gate region.

3. A bilateral controllable semiconductor switching device including a body of semiconductor material having three contiguous regions forming an internal region of one conductivity type and two outer regions of the opposite conductivity type, at least one external region of the one conductivity type provided adjacent a first one of the said outer regions, at least two spaced apart external regions of the one conductivity type provided adjacent a second one of said outer regions, said external regions being positioned in such a manner that a portion of each said outer regions is exposed, and said two external regions have portions which overlap a portion of said one external region for conduction purposes, a first main current carrying electrode in low resistance ohmic contact with said one external region and an exposed portion of said first one of said outer regions which overlaps one of said two external regions adjacent said second outer region for conduction purposes, a second main current carrying electrode in low resistance ohmic contact with said two spaced apart external regions and the intervening exposed portion of said second outer region, a gate region of said one conductivity type adjacent a portion of said first one of said outer regions which is adjacent to and on the opposite side of said one external region from the portion of said first outer region contacted by said first main electrode and positioned opposite at least a portion of one of said two external regions to form an overlap therewith for conduction purposes, and a gate electrode in low resistance ohmic contact with said gate region and a portion of said first one of said outer regions.

4. A bilateral controllable semiconductor switching device including a body of semiconductor material having three contiguous regions forming an internal region of one conductivity type and two outer regions of the opposite conductivity type, at least two spaced apart external regions of the one conductivity type provided adjacent a first one of the said outer regions, at least three spaced apart external regions of the one conductivity type provided adjacent a second one of said outer regions, said external regions in said first and second outer regions being positioned in such a manner that a portion of each of said outer regions is exposed and each of said two external regions have portions which overlap a portion of two of said three external regions for conduction purposes, a gate region of the one conductivity type adjacent said first one of said outer regions and spaced from said two spaced apart external regions, a first main current carrying electrode in low resistance ohmic contact with said two spaced apart external regions and exposed portions of said first one of said outer regions which overlaps at least portions of two of said three external regions for conduction purposes, a second main current carrying electrode in low resistance ohmic contact with said three external regions and exposed portions of said second outer region, a gate region adjacent the first one of said outer regions and positioned so that it is spaced apart from said two spaced apart external regions and opposite one of said three external regions to define an overlap for conduction purposes, and a gate electrode in low resistance ohmic contact with said gate region to provide means for switching said device between high and low impedance states for current through said device in opposite senses.

5. A bilateral controllable semiconductor switching device including a body of semiconductor material having three contiguous regions forming an internal region of one conductivity type and two outer regions of the opposite conductivity type, at least one external region of the one conductivity type provided adjacent a first one of the said outer regions, at least two spaced apart external regions of the one conductivity type provided adjacent a second one of said outer regions, said external regions in said first and second outer regions being positioned in such a manner that a portion of each said outer regions is exposed and said two external regions have portions which overlap a portion of said one external region for conduction purposes, a first main current carrying electrode in low resistance ohmic contact with said one external region and an exposed portion of said first one of said outer regions which overlaps one of said two external regions for conduction purposes, a second main current carrying electrode in low resistance ohmic contact with said two spaced apart external regions and the intervening exposed portion of said second outer region, a gate region of said one conductivity type adjacent the first one of said outer regions and positioned so that it is spaced from said one external region and opposite a portion of one of said two external regions to define an overlap for conduction purposes, a tunnel junction straddling a portion of the junction formed between said gate region and said first one of said outer regions, and a single gate electrode in low resistance ohmic contact with said gate region.

6. A bilateral controllable semiconductor switching device including a body of semiconductor material having three contiguous regions forming an internal region of one conductivity type and two outer regions of the opposite conductivity type, at least two spaced apart external regions of the one conductivity type provided adjacent a first one of the said outer regions, at least three spaced apart external regions of the one conductivity type provided adjacent a second one of said outer regions, said external regions in said first and second outer regions being positioned in such a manner that a portion of each said outer regions is exposed and each of said two external regions have portions which overlap a portion of two of said three external regions for conduction purposes, a first main current carrying electrode in low resistance ohmic contact with said two spaced apart external regions and exposed portions of said first one of said outer regions which overlaps at least portions of two of said three external regions for conduction purposes, a second main current carrying electrode in low resistance ohmic contact with said three external regions and exposed portions of said second outer region, a gate region adjacent the first one of said outer regions and positioned so that it is spaced apart from said two spaced apart external regions and opposite one of said three external regions to define an overlap for conduction purposes, a gate electrode and means for coupling said gate electrode to said gate region including a bilateral diode switch having one terminal end positioned adjacent said gate region and electrically connected tnereto and said gate electrode in low resistance ohmic contact with the opposite terminal end of said bilateral diode whereby said device is in series circuit relationship with the device gate circuit.

7. A bilateral controllable semiconductor switching device including a body of semiconductor material having three contiguous regions forming an internal region of one conductivity type and two outer regions of the opposite conductivity type, at least two spaced apart external regions of the one conductivity type provided adjacent a first one of the said outer regions, at least three spaced apart external regions of the one conductivity type provided adjacent a second one of said outer regions, said external regions in said first and second outer regions being positioned in such a manner that a portion of each said outer regions is exposed and each of said two external regions have portions which overlap a portion of two of said three external regions for conduction purposes, a first main current carrying electrode in low resistance ohmic contact with said two spaced apart external regions and exposed portions of said first one of said outer regions which overlaps at least portions of two of said three external regions for conduction purposes, a second main current carrying electrode in low resistance ohmic contact with said three external regions and exposed portions of said second outer region, a gate region adjacent the first one of said outer regions and positioned so that it is spaced apart from said two spaced apart external regions and opposite one of said three external regions to define an overlap for conduction purposes, a gate electrode, and means for coupling said gate electrode to said first outer region including a bilateral diode switch having five regions of one and the opposite conductivity type, regions of one conductivity type being interleaved with regions of the opposite conductivity type forming a plurality of P-N junctions therein, a first terminal portion of said diode switch including an external layer of said diode and an exposed surface of an adjacent intermediate layer in low resistance ohmic contact with said gate region, said gate electrode being in low resistance ohmic contact with a surface of the other external layer of said body and an exposed surface of an adjacent intermediate layer.

8. A bilateral controllable switching device as defined in claim 7 wherein a gate region of said one conductivity type is provided in said first one of said outer regions and said first terminal portion of said diode is in low resistance ohmic contact with said gate region.

9. A bilateral controllable semiconductor switching device including a body of semiconductor material having three contiguous regions forming an internal region of one conductivity type and two outer regions of the opposite conductivity type, at least one external region of the one conductivity type provided adjacent a first one of the said outer regions, at least two spaced apart external regions of the one conductivity type provided adjacent a second one of said outer regions, said external regions being positioned in such a manner that a portion of each said outer regions is exposed and said two external regions have portions which overlap a portion of said one external region for conduction purposes, a first main current carrying electrode in low resistance ohmic contact with said one external region and an exposed portion of said first one of said outer regions which overlaps one of said two external regions for conduction purposes, a second main current carrying electrode in low resistance ohmic contact with said two spaced apart external regions and the intervening exposed portion of said second outer region, a gate region of said one conductivity type adjacent said first outer region, and gate electrode means conductively coupled to said gate region by means of a diode switch positioned and electrically connected between said gate electrode and said gate region.

10. A bilateral controllable semiconductor switch as defined in claim 9 wherein said diode includes a semiconductor body having five layers of one and the opposite conductivity type, layers of one conductivity type being interleaved with layers of the opposite conductivity type forming a plurality of P-N junctions therein.

11. A bilateral controllable semiconductor switch as defined in claim 9 wherein said diode has five layers of one and the opposite conductivity type, layers of one conductivity type being interleaved with layers of the opposite conductivity type forming a plurality of P-N junctions therein, a first terminal portion of said diode including an external layer of said diode and an exposed surface of an adjacent intermediate layer in low resistance ohmic contact with said gate region, said gate electrode being in low resistance ohmic contact with a surface of the other externnal layer of said body and an exposed surface of an adjacent intermediate layer.

12. A bilateral controllable semiconductor switching device including a body of semiconductor material having three contiguous regions forming an internal region of one conductivity type and two outer regions of the opposite conductivity type, at least one external region of the one conductivity type provided adjacent a first one of the said outer regions, at least two spaced apart external regions of the one conductivity type provided adjacent a second one of said outer regions, said external regions being positioned in such a manner that a portion of each said outer regions is exposed and said two external regions have portions which overlap a portion of said one external region for conduction purposes, a first main current carrying electrode in low resistance ohmic contact with said one external region and an exposed portion of said first one of said outer regions which overlaps one of said two external regions for conduction purposes, a second main current carrying electrode in low resistance ohmic contact with said two spaced apart external regions and the intervening exposed portion of said second outer region, a gate region of said one conductivity type adjacent said first outer region of the opposite side of said one external region from the portion of said first outer region contacted by said first main electrode, an external gate region of said opposite conductivity type adjacent said gate region, and a gate electrode in low resistance ohmic contact with sai dexternal gate region.

References Cited

UNITED STATES PATENTS

| | | | |
|---|---|---|---|
| 2,971,139 | 2/1961 | Noyce | 317—235 |
| 3,079,512 | 2/1963 | Rutz | 317—235 |
| 3,090,873 | 5/1963 | Mackintosh | 317—235A |
| 3,123,750 | 3/1964 | Hutson et al. | 317—235A |
| 3,176,147 | 3/1965 | Miller | 317—235 |
| 3,188,490 | 6/1965 | Hoff et al. | 307—88.5 |
| 3,196,330 | 7/1965 | Moyson | 317—235 |
| 3,206,612 | 9/1965 | Swanekamp et al. | 307—88.5 |

FOREIGN PATENTS

| | | |
|---|---|---|
| 1,267,417 | 6/1961 | France. |
| 945,249 | 12/1963 | Great Britain. |

JOHN W. HUCKERT, *Primary Examiner.*

J. D. CRAIG, J. R. SHEWMAKER, *Assistant Examiners.*